United States Patent [19]
Alvermann

[11] 4,403,760
[45] Sep. 13, 1983

[54] APPARATUS FOR RAISING AND LOWERING AN OBJECT

[76] Inventor: Palmer C. Alvermann, Rte. 1, Box 138, Clear Lake, Wis. 54005

[21] Appl. No.: 272,657

[22] Filed: Jun. 11, 1981

[51] Int. Cl.³ .............................................. E04G 3/00
[52] U.S. Cl. ................................................. 248/284
[58] Field of Search .................... 248/284; 248/280.1, 248/281.1, 123.1, 145

[56] References Cited

U.S. PATENT DOCUMENTS

| | | | |
|---|---|---|---|
| 2,898,066 | 8/1959 | Ouellette | 248/145 |
| 2,997,242 | 8/1961 | Grosholz | 248/123.1 |
| 3,391,890 | 7/1968 | Perbal | 248/280.1 |
| 3,436,046 | 4/1969 | Valeska | 248/284 |
| 3,749,342 | 7/1973 | Perrine | 248/123.1 |
| 4,166,602 | 9/1979 | Nilsen et al. | 248/280.1 |

OTHER PUBLICATIONS

*Warner Electric Brake & Clutch Company* Publication, Beloit, Wisconsin 53511, 10/76.

*Primary Examiner*—William H. Schultz
*Assistant Examiner*—Ramon O. Ramirez
*Attorney, Agent, or Firm*—Burd, Bartz & Gutenkauf

[57] ABSTRACT

An apparatus for selectively holding an object, such as a mailbox, in an up or down position having an arm pivoted to an upright post. A mailbox support platform is pivotally connected to the outer end of the arm. A linear actuator pivotally connected to the inner end of the arm and anchored on the post operates to pivot the arm from a generally horizontal position to a raised position. A control rod is pivotally connected at its outer end to the mailbox support structure. The inner end of the control rod carries rollers which ride in a vertical track secured to the post. A rigid link interconnects the inner ends of the arm and control rod causing the inner end of the control rod to move along the track and the mailbox support platform to pivot on the arm to maintain the mailbox in a generally horizontal position as it moves between its down and up positions.

31 Claims, 12 Drawing Figures

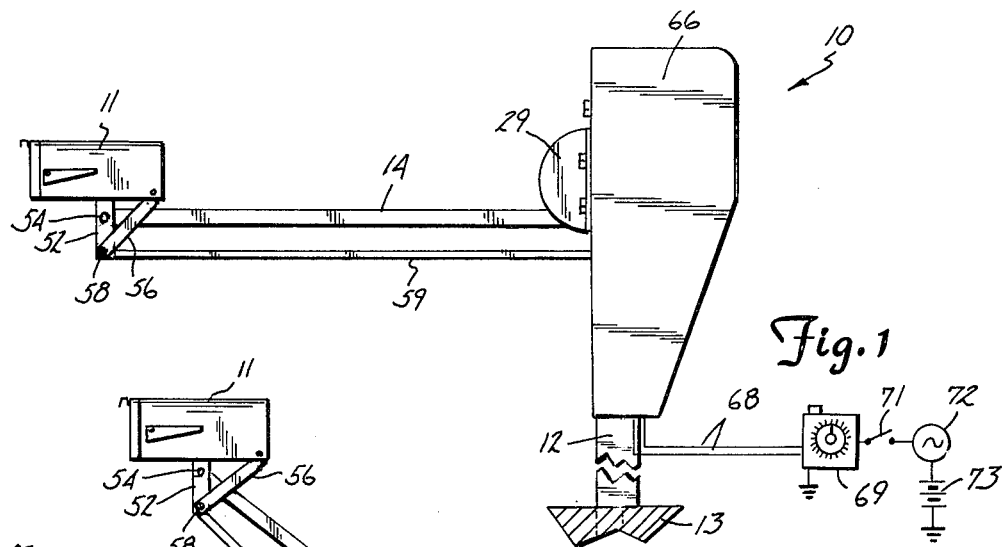
Fig. 1
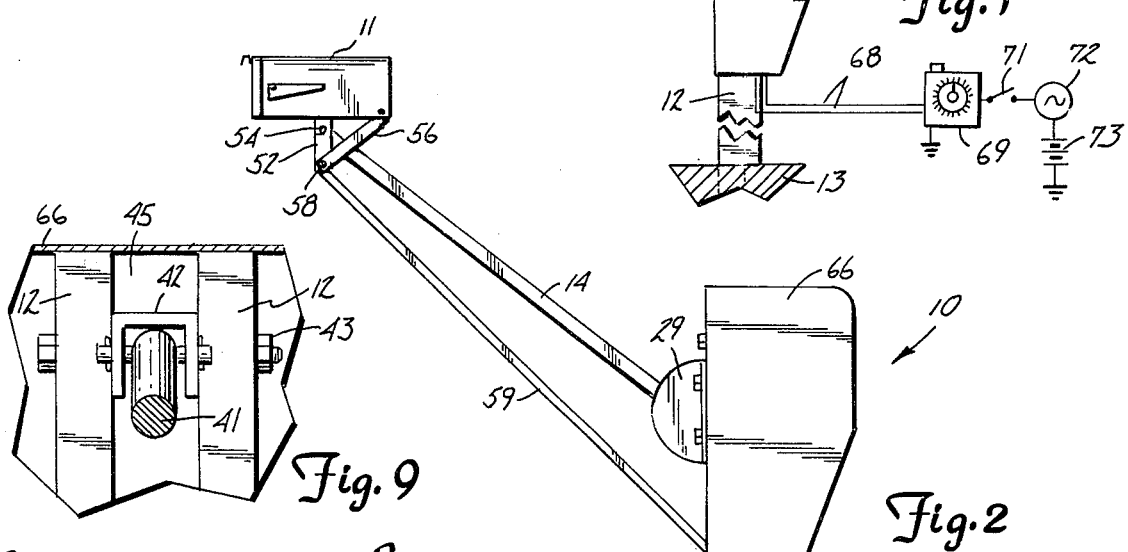
Fig. 9
Fig. 2
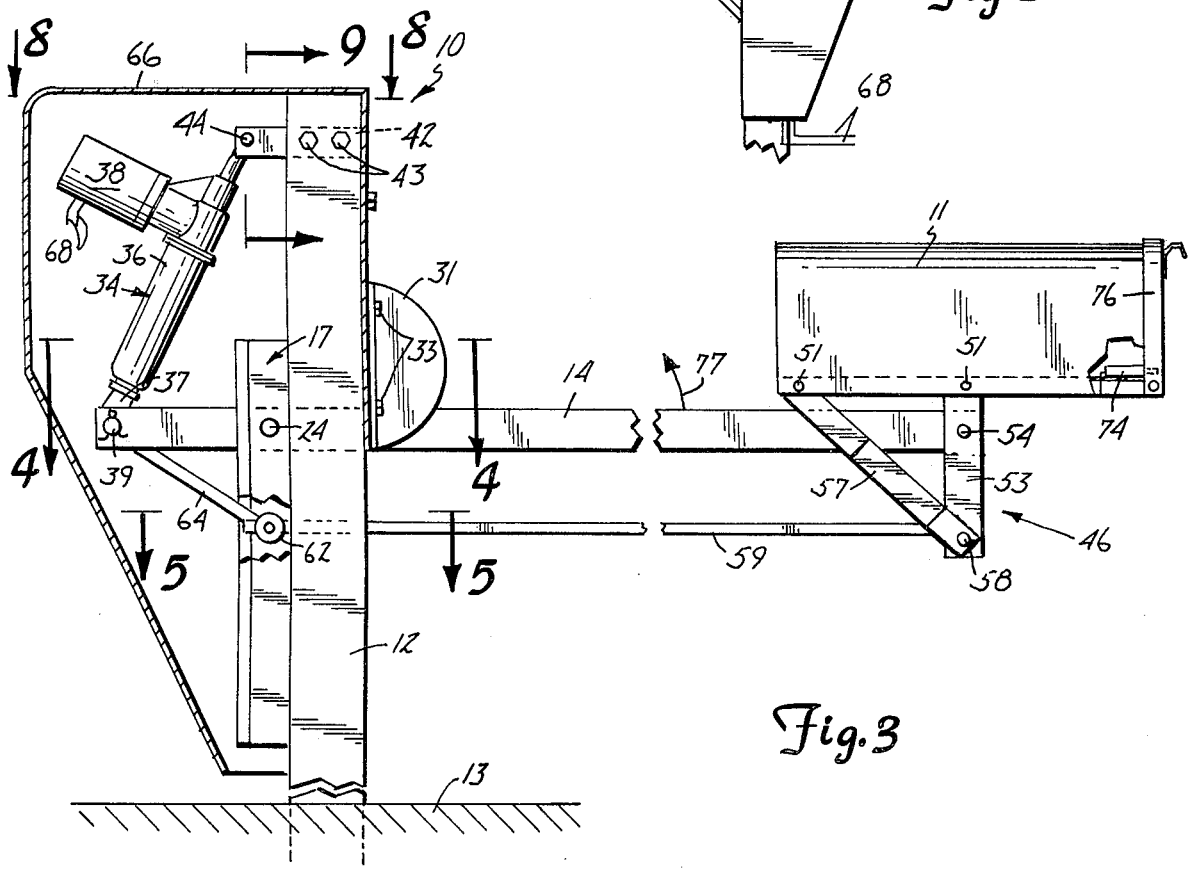
Fig. 3

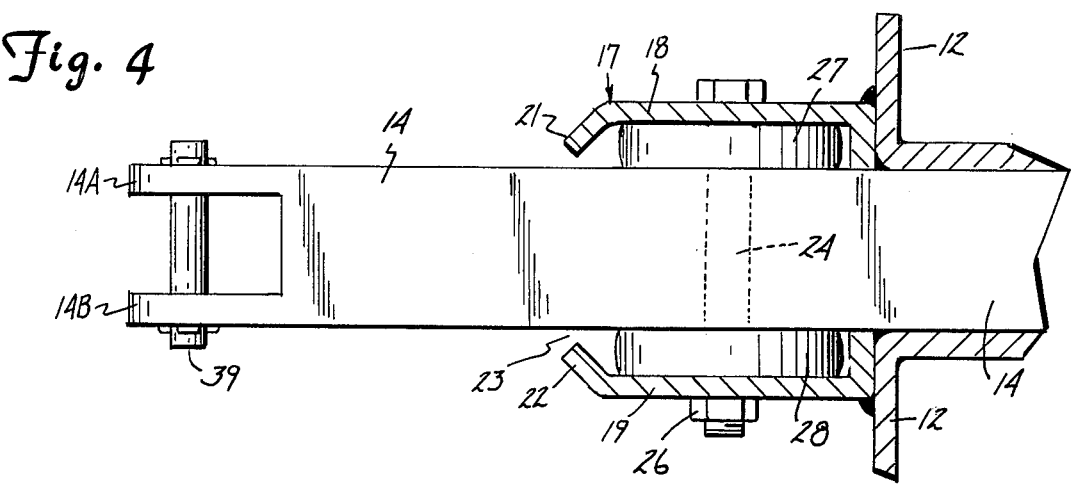
Fig. 4
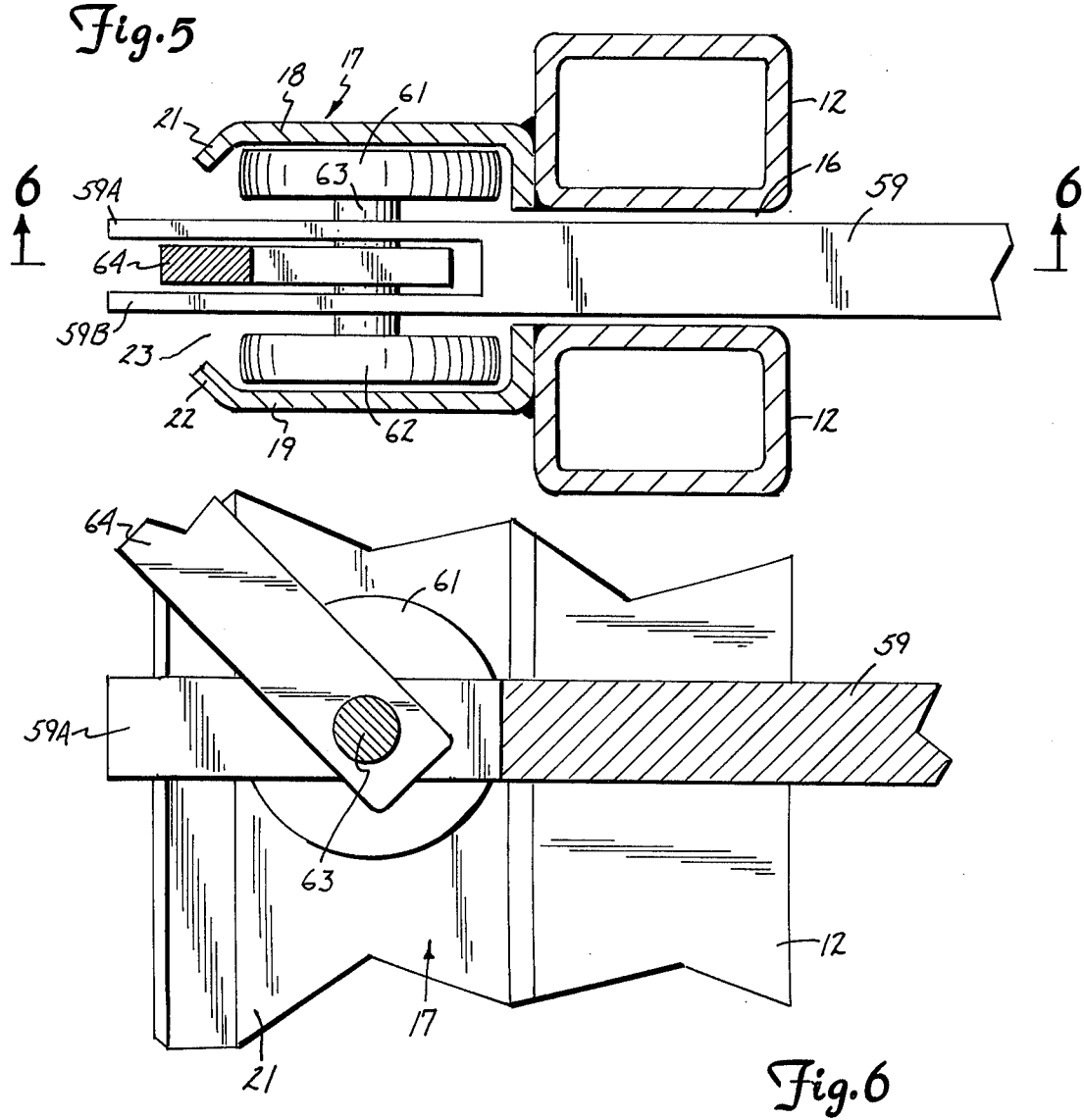
Fig. 5
Fig. 6

APPARATUS FOR RAISING AND LOWERING AN OBJECT

SUMMARY OF INVENTION

The invention is directed to an apparatus for selectively moving an object between first and second positions and holding the object in a desired position. More particularly, the apparatus operates to elevate an object from a lower position to a higher position and selectively retain the object in a desired position between the lower position and upper position. The apparatus has a support pivotally carrying an arm or boom. The arm has an outer end connected to a means for carrying or supporting an object. The arm has an inner end connected to an expandable and contractible means, such as a linear actuator, operable to pivot the arm to move the means for supporting an object between a first and second position. The means for supporting an object mounted on the arm is retained in a selected position, such as a horizontal position, with control means which operates in association with movement of the expandable and contractible means. The control means includes a control rod pivotally connected to the means for supporting an object and movably associated with a track means connected or mounted on the support. The inner end of the control means carries rollers that ride on the track means to linearly guide the inner end of the control means in response to pivotal movement of the arm. The linear movement of the inner end of the control means in conjunction with the pivotal movement of the arm causes pivotal movement of the means for supporting an object to maintain the selected orientation, such as horizontal, of the means for supporting an object during movement of the arm from its first or lower position to its second or raised position. A rigid link means connects the inner end of the arm with the inner end of the control means whereby the pivotal movement of the arm is simultaneous with the linear movement of the control means. The expandable and contractible means has an electric motor that is electrically coupled with a remote control, such as a timer, operable to periodically operate the expandable and contractible means. Other types of control means are useable to selectively operate the expandable and contractible means and thereby raise and lower the arm.

The apparatus is used in association with a mailbox to selectively locate the mailbox in a down position where it is accessible to the mail carrier and an up position. When the mailbox is in its up position, it does not create an obstruction for snow plows, grass mowing machines, farm machinery, and vehicles. The mailbox in the up position is located well above the normal elevation of the windshield of a car or truck, thereby minimizing the hazard of a windshield hitting the mailbox. In addition, when the mailbox is in its up position, the mail is out of reach, reducing incidences of unauthorized entry and abuse of the mailbox.

The mailbox support apparatus has an upright post means that is adapted to be fixed or anchored to the ground. An elongated arm is pivotally mounted on the upper portion of the post means with a first pivot for movement between a down generally horizontal position to a raised or up position. When the arm is in an up position, it extends upwardly and outwardly away from the top portion of the post means. An expandable and contractible means, such as a linear actuator, is connected to the upper end of the post means and the inner end of the arm. The expandable and contractible means powered by an electric motor functions to drive the arm between its up and down positions. A mailbox support means is connected to the outer end of the arm. The mailbox support means has a platform that is shaped to accommodate the lower end of a conventional mailbox. A second pivot means connects the mailbox support means to the outer end of the arm. The mailbox support means and mailbox is retained in a generally horizontal position during the movement of the arm between the lower and upper positions by a control rod means that is located adjacent the arm. A third pivot means pivotally connects the control rod means to the mailbox support means. The inner end of the control rod means is movably associated with an upright track means secured to the post. Roller means connected to the inner end of the control rod means is associated with the track means to guide the control rod means along the linear path of the track means. A rigid link means connects the arm and control rod means whereby on operation of the expandable and contractible means the arm pivots about the first pivot means and the control rod means moves along the linear track means. The combined pivotal movement of the arm and linear movement of the inner end of the control means causes the mailbox support to pivot on the second and third pivots and maintain the mailbox in a generally horizontal position as it moves between the down and up positions. The mail, such as letters and packages, in the mailbox will remain in the mailbox as it is moved from the down position to the up position. The electric motor of the expandable and contractible means is operated through a timer that is remotely located, such as in a building or house, associated with the mailbox. The timer can be set to actuate the motor at a selected time period that coincides with the normal delivery of the mail. When the timer is energized, the expandable and contractible means is contracted to lower the mailbox to its down or generally horizontal position. The timer, after a pre-selected period of time, operates to expand the expandable and contractible means and thereby raise the mailbox to its raised position. A manually operated switch is included in the circuit for the motor to allow the operator to manually move the mailbox between its down and up positions as desired. A switch is associated with the door of the mailbox to interrup the power to the electric motor. When the door is open, the circuit to the motor for the expandable and contractible means is open, thereby eliminating the operation of the motor. The switch associated with the mailbox can also energize an alarm or light which provides a visual or audible signal indicating that the mailbox is being moved between its down and up positions.

IN THE DRAWINGS

FIG. 1 is a fragmentary side elevational view of the mailbox support apparatus of the invention with the mailbox in the down position;

FIG. 2 is a side elevational view similar to FIG. 1 showing the mailbox in the up position;

FIG. 3 is an enlarged fragmentary side elevational view of the mailbox support apparatus;

FIG. 4 is an enlarged sectional view taken along the line 4—4 of FIG. 3 with the linear actuator removed;

FIG. 5 is an enlarged sectional view taken along the line 5—5 of FIG. 3;

FIG. 6 is a sectional view taken along the line 6—6 of FIG. 5;

FIG. 9 is a sectional view taken along the line 9—9 of FIG. 8;

DESCRIPTION OF PREFERRED EMBODIMENT

Figure 7:
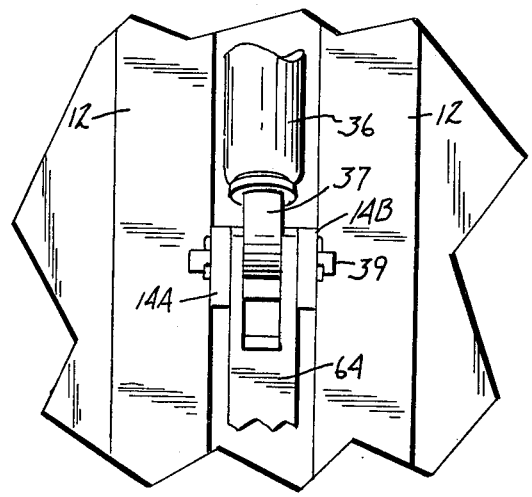
FIG. 7 is an enlarged front elevational view showing the connection of the lower end of the linear actuator with the arm.

Referring to FIGS. 1 and 2, there is shown a support apparatus indicated generally at 10 for positioning an object 11 in selected locations. FIG. 1 shows mailbox in its down or first position. The first position is approximately 39 inches from the ground, making the mailbox accessible to the mail carrier. FIG. 2 shows the mailbox 11 in its up or elevated position. When mailbox 11 is in its elevated position, it is 8 to 10 feet above the ground. Mailbox 11 is located at an elevated substantially above the elevation of a windshield of a vehicle, thereby minimizing the hazard of a vehicle hitting a mailbox. The up and down positions of mailbox 11 can vary in accordance with the desires of the user. Support apparatus 10 has upright posts 12 having lower ends anchored in ground 13. Posts 12 can be metal tubular members, wood members, plastic members, concrete members, and like rigid members or a single member anchored to the ground. Other types of structures can be used to provide a fixed support.

The following description is directed to an apparatus for raising and lowering a U.S. mailbox. The apparatus of the invention is not intended to be limited to a mailbox positioning apparatus. The apparatus is a raising and lowering mechanism operable to change the elevation of a load connected to the apparatus. Cables and lines can be used to couple the load to the apparatus.

A laterally directed boom or arm 14 extends from the upper portion of posts 12. Arm 14 projects through an opening 16 between posts 12 and through a track or channel member 17. As shown in FIGS. 3, 4, and 5, track member 17 is secured to the upright sides of posts 12 in longitudinal alignment with the opening 16. Track member 17 has upright side flanges 18 and 19 terminating in linear lips 21 and 22. Lips 21 and 22 are inclined toward each other and form a linear opening 23. Arm 14 extends through the linear opening 23. A bolt 24 pivotally connects arms 14 to side flanges 18 and 19. Nut 26 threaded onto bolt 24 holds bolt 24 in assembled relation with track member 17. Spacers or washers 27 and 28 are interposed between opposite sides of arm 14 and the inside surfaces of side flanges 18 and 19 to minimize lateral movement of arm 14 and binding of the arm on the posts 12.

As shown in FIGS. 1, 2, 3, and 8, a pair of semicircular plate members 29 and 31 are secured to posts 12 with bolts 32 and 33, respectively. The plate members 29 and 31 are located on opposite sides of arm 14 and serve as guides to direct the movement of arm 14 in the vertical direction and laterally stabilize the arm 14.

Figure 8:
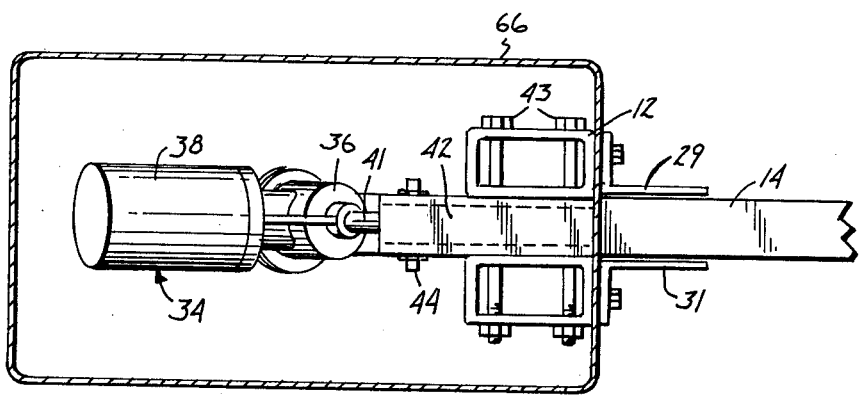
FIG. 8 is a sectional view taken along the line 8—8 of FIG. 3.

An expandable and contractible unit indicated generally at 34 is secured to the upper end of posts 12 and the inner end of arm 14. Unit 34 is operable to control the pivotal movement of arm 14 and hold arm 14 in a fixed position. The expandable and contractible unit 34 is preferably an electromechanical linear actuator model DCA-5JB, marketed by the Warner Electric Brake and Clutch Company, Beloit, Wis. Other types of linear actuators can be used to pivot arm 14. The linear actuator has a cylindrical housing 36 accommodating a rod 37 that is longitudinally moved into and out of the housing by the operation of a DC electric motor 38. As shown in FIG. 7, rod 37 extends between the end ears 14A and 14B of arm 14 and accommodates transverse pivot pin 39. Pin 39 pivotally connects rod 37 to the arm ears 14A and 14B. The upper end of unit 34 is anchored to the upper portion of posts 12. The upper end of unit 34 has an upwardly directed ear 41 having a hole to accommodate a pivot pin 44. Pin 44 is pivotally mounted on a channel member 42. As shown in FIG. 8, nut and bolt assemblies 43 secure channel member 42 to the upper ends of posts 12. As shown in FIGS. 8 and 9, channel member 42 is located between the upper ends of posts 12. Linear actuator 34 is provided with limit and reversing switches (not shown) so that when the actuator 34 is fully contracted and fully expanded, the power to motor 38 is cut off and the electric circuit is reversed. When power is subsequently supplied to the motor 38 it will operate in a reverse direction so that arm 14 will be powered up and down between its down and up positions.

Figure 10:
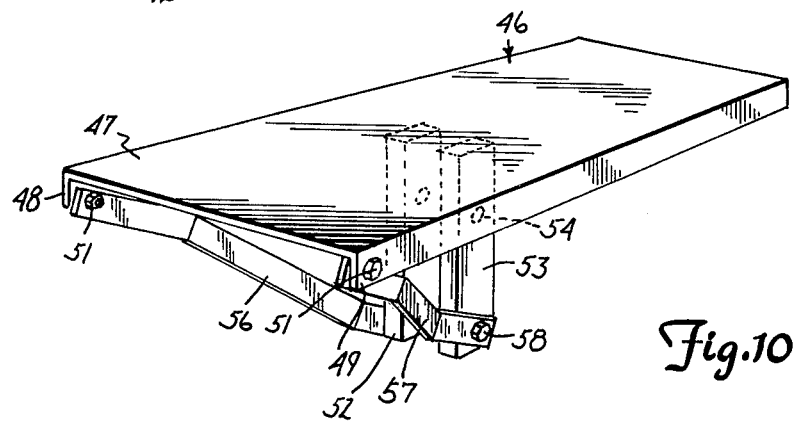
FIG. 10 is a perspective view of the support frame for the mailbox.

As shown in FIG. 3, a mailbox 11 is pivotally mounted on the outer end of arm 14 with a platform assembly indicated generally at 46. Referring to FIG. 10, platform assembly 46 has a generally flat base 47 having downwardly directed linear side flanges 48 and 49. Base 47 and flanges 48 and 49 fit into the generally rectangular recess in the bottom of mailbox 11. A plurality of fasteners 51 secure the lower edges of mailbox 11 to flanges 48 and 49. The mid-portion of base 47 has a pair of downwardly directed legs 52 and 53 located adjacent opposite sides of the outer end of arm 14. A transverse pivot pin 54 pivotally connects arm 14 to legs 52 and 53. The pivot pin 54 allows the mailbox 11 to pivot about a generally horizontal axis extended normal to the longitudinal length of arm 14. A pair of braces 56 and 57 extend downwardly and forwardly from the inner end of base 47 to the lower end of the legs 52 and 53. Pivot pin 58 pivotally connects the braces 56 and 57 to the legs 52 and 53. Fasteners 51, such as nut and bolt assemblies, connect the upper ends of the braces 56 and 57 to the flanges 48 and 49.

A control rod 59 is located below and in general longitudinal alignment with arm 14. The outer end of control rod 59 is connected to pivot pin 58. The inner end of control rod 59 extends through opening 16 between posts 12 and into the space between the side flanges 18 and 19 of the track member 17. As shown in FIG. 5, a pair of rollers 61 and 62 are located adjacent opposite sides of rod 59 within track member 17. An axle 63 mounted on rod 59 rotatably supports the rollers 61 and 62. The inner end of rod 59 is bifurcated into ears 59A and 59B that extend through the linear mouth 23 of track member 17. A rigid link 64 has a lower end located between the ears 59A and 59B and pivotally mounted on axle 63. The upper end of link 64, as shown in FIG. 7, is bifurcated and pivotally mounted on pin 39. Linear actuator 34 and the upper ends of posts 12 are enclosed within a box-shaped cover 66. Cover 66 can be a metal or plastic housing that can be removed to provide access to the linear actuator 34.

As shown in FIG. 1, electric motor 38 of linear actuator 34 is connected to a source of power with a line 68, such as an underground cable. Line 68 leads to a timer 69 positioned in a remote location. A main switch 71 connects the timer 69 to an overload fuse 72. The fuse is connected to a battery 73, such as a 12-volt battery or a transformer having a 12-volt output. The transformer can be coupled to the conventional 110 AC electrical power supply. Timer 69 is manually set to apply power to the DC motor 38 at selected periods of time. The timer is set to actuate the motor 38 at the time that approximates the arrival time of the mail carrier at the mailbox 11. Timer 69 also has manual switches which function to reverse the power supplied to the DC motor 38 whereby arm 14 can be moved between its up and down positions at selected times. The limit switches associated with the linear actuator 34 control the up and down positions of the arm 14 and reverse the power supply to the motor 38. Other types of limit controls associated with the linear actuator 34 can be used to select the down and up location of arm 14.

As shown in FIG. 3, mailbox 11 is provided with a safety switch 74 that is acutated when mailbox door 76 is opened. When door 76 is open, the power supplied to the motor 38 is cut off. This prevents the operation of the linear actuator 34 when the mail carrier and other persons are inserting and removing mail from within box 11. A second alarm or light (not shown) can be associated with switch 74 so that when the door 76 is open the inside of the mailbox will be illuminated and persons near the mailbox will be warned of movement of the arm and mailbox.

In use, posts 12 are anchored adjacent the side of the road to locate the mailbox 11 at a selected position relative to the curb or shoulder of the road. When linear actuator 34 is in its contracted position, as shown in FIG. 3, it holds the arm 14 in a generally horizontal position. This locates the mailbox 11 in a generally horizontal position above the ground where it is accessible to the mail carrier for inserting and removing mail from the box. Timer 69 functions at a selected period of time to lower the mailbox and hold it in its down position. A limit switch associated with the linear actuator 34 terminates the power supply to motor 38 thereby locating arm 14 in its horizontal position. Timer 69 operates to energize the electric motor 38 which actuates linear actuator 36. Rod 37 will move downwardly and outwardly from housing 36 causing arm 14 to move in a counter-clockwise direction, as shown by the arrow 77 in FIG. 3. Arm 14 pivots about the pivot bolt 24 upwardly between the semi-circular plates 29 and 31. Control rod 59 is moved downwardly in the track member 17 by rigid link 64 as arm 14 pivots upwardly. The rod 59 causes the platform 46 to pivot in a counter-clockwise direction about the pivot pin 54 to maintain the mailbox in a generally horizontal position,, as it moves from the forward position, as shown in FIGS. 1 and 3, to its elevated position, as shown in FIG. 2. Arm 14 will continue to move up until the linear actuator 34 is fully expanded. A limit switch associated with the linear actuator will terminate power to motor 38 when the actuator 34 is fully expanded. The linear actuator 34 holds the arm 14 in the raised or up position. Control rod 59 and platform 46 retain the mailbox 11 in its generally horizontal position when it is in its elevated position.

The mailbox will remain in its elevated position as the linear actuator 34 functions as a fixed link which is varied in length by operation of the motor 38. When the main switch 71 is open, the mailbox will remain in its fixed location. The timer 69 also has a by-pass switch whereby the operator can manually operate the timer to supply power to the electric motor 38. The operator can thereby control the position of the mailbox from the remote location.

Figures 11, 12:
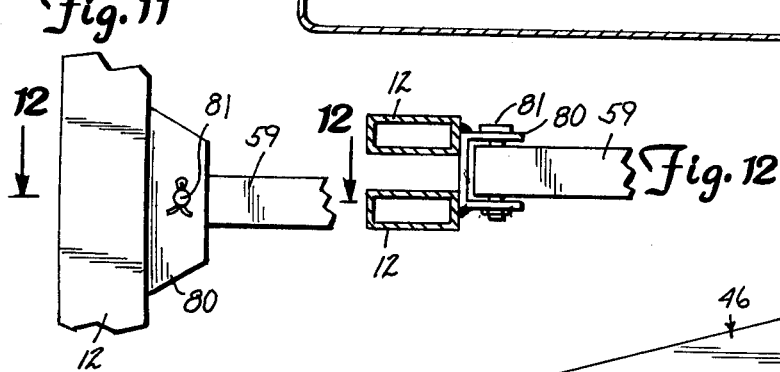
FIG. 11 is a side elevational view of a modification of the central rod mount.
FIG. 12 is a sectional view taken along the line 12—12 of FIG. 11.

Referring to FIGS. 11 and 12, there is shown a modification of the mount for the inner end of control rod 59. A U-shaped bracket 80 is secured to the front side of post 12 with bolts, welds, or the like. A horizontal pivot pin 81 pivotally connects the inner end of rod 59 to the side flanges of bracket 80. Bracket 80 and pivot pin 81 are used in lieu of link 64 and rollers 61 and 62. The remaining parts of the mailbox support are not changed.

While there has been shown and described a movable support apparatus for a mailbox, it is understood that the support apparatus can be used as a hoist to raise and lower an object connected to the platform 46. The support apparatus can also be used as a material handling unit that can elevate and move material from upper to lower locations. Changes in materials, size of materials, and use of the apparatus may be made by one skilled in the art without departing from the invention. The invention is defined in the following claims.

The embodiments of the invention in which an exclusive property or privilege is claimed are defined as follows:

1. An apparatus for selectively moving an object between first and second positions and holding the object in a desired position comprising: a support, an arm, means pivotally connecting the arm to the support allowing the arm to move relative to the support, an expandable and contractible means connected to the support and arm operable to pivot the arm between first and second positions, means adapted to be connected to an object, means connecting the arm to the means adapted to be connected to an object, control means located adjacent to said arm, means connecting the control means to the means adapted to be connected to an object, track means secured to the support, means connected to the control means cooperating with the track means to guide the control means along the track means, link means connecting the arm and control means whereby on operation of the expandable and contractible means the arm pivots and control means move along the track means and the means adapted to be connected to an object move between first and second positions.

2. The apparatus of claim 1 wherein: the support has an opening, said arm expanded through said opening, and guide plates secured to said support adjacent opposite sides of the arm.

3. The apparatus of claim 1 wherein: said support is an upright post means having a lower end adapted to be anchored to fixed means, said track means being extended in a general upright direction and secured to said post means.

4. The apparatus of claim 3 wherein: said post means has a generally upright opening, said track means has an opening, said arm extended through said openings in the post means and track means, and said means pivotally mounting the arm to the support including pivot means mounted on the track means.

5. The apparatus of claim 4 wherein: said track means comprises a generally U-shaped member having a generally upright channel, said means connected to the control means including roller means located in said channel, and said arm extended through said channel.

6. The apparatus of claim 3 wherein: said post means has a first upright portion and a second upright portion opposite the first upright portion, said post means and track means having aligned openings, said arm extended through said openings.

7. The apparatus of claim 6 wherein: said means pivotally mounting the arm to the support includes pivot means connecting the arm on the track means.

8. The apparatus of claim 6 including: guide means secured to said second upright portion of the post means, said guide means being located adjacent opposite sides of the arm to laterally stabilize the arm.

9. The apparatus of claim 1 wherein: the expandable and contractible means comprises a linear actuator having an electric motor, and means for controlling the electric power supply to said electric motor.

10. The apparatus of claim 9 wherein: the means for controlling the power supply to said electric motor includes a timer operable to periodically supply electric power to said motor thereby operating the linear actuator.

11. The apparatus of claim 1 wherein: the means adapted to be connected to an object is a platform assembly for supporting the object, said platform assembly having leg means, said arm and control means being connected to said leg means to control the position of the platform assembly relative to the arm during movement of the arm between the first and second positions thereof.

12. The apparatus of claim 11 wherein: said platform assembly has a generally horizontal base, said control means being operable to substantially maintain the horizontal relationship of the base during movement of said arm.

13. The apparatus of claim 1 wherein: said means connected to the control means cooperating with the track means to guide the control means along the track means comprise a pair of rollers located adjacent opposite sides of the control means, and means mounting the pair of rollers on the roller means, each of said rollers being engageable with the track means.

14. The apparatus of claim 13 wherein: said track means is a U-shaped member having an upright channel, said rollers being located in said channel and engageable with the U-shaped member and movable along said channel in response to operation of the expandable and contractible means.

15. The apparatus of claim 1 wherein: the control means is a rod located generally parallel to the arm.

16. The apparatus of claim 1 including: first pivot means pivotally connecting the arm to the means adapted to be connected to an object, and second pivot means pivotally connecting the control means to the means adapted to be connected to an object.

17. The apparatus of claim 16 wherein: the means adapted to be connected to an object includes leg means for accommodating the first and second pivot means.

18. The apparatus of claim 1 wherein: the means adapted to be connected to the object includes leg means, said means connecting the arm to the means adapted to be connected to an object comprising first pivot means connected to the leg means, and the means connecting the control means to the means adapted to be connected to an object comprising second pivot means connected to the leg means, said leg means pivoting about said first and second pivots during movement of the arm between the first and second positions thereof to maintain the object in a generally horizontal position as it moves with the arm.

19. An apparatus for selectively holding a mailbox in an up or down position and moving the mailbox between these positions comprising: upright post means adapted to be anchored to the ground, an arm, first pivot means mounting the arm to the post means for movement between a down generally horizontal position to an up position, an expandable and contractible means connected to the post means and arm to pivot the arm between the up and down positions thereof, mailbox support means adapted to be connected to the mailbox and hold the mailbox in a generally horizontal position, second pivot means connecting the mailbox support means to the arm, control rod means located adjacent said arm, third pivot means connecting the control rod means to the mailbox support means, upright track means secured to the post means, roller means connected to the control rod means cooperating with the track means to guide the control rod means along the track means, link means connecting the arm and control rod means whereby on operation of the expandible and contractible means the arm pivots and control rod means move along the track means and the mailbox support means pivot about the second and third pivot means to maintain the mailbox in a generally horizontal position as it moves between the down and up positions.

20. The apparatus of claim 19 wherein: said upright post means has a generally upright opening, said track means having an opening aligned with the upright opening of the post means, said arm extended through said openings in the post means and track means, and said first pivot means mounting the arm to the post means including a pivot pin mounted on the track means.

21. The apparatus of claim 20 including: guide means secured to said upright post means, said guide means being located adjacent opposite sides of the arm to laterally stabilize the arm.

22. The apparatus of claim 20 wherein: said track means comprises a generally U-shaped member having a generally upright channel, said roller means being located in said channel, and said arm extended through said channel.

23. The apparatus of claim 19 wherein: said upright post means has a first upright portion, and a second upright portion opposite the first upright portion, said track means being secured to the first upright portion, said post means and track means having aligned upright openings, said arm extended through said aligned openings.

24. The apparatus of claim 23 wherein: said means pivotally mounting the arm to the upright post means includes a pivot pin connecting the arm to the track means.

25. The apparatus of claim 23 including: guide means secured to said second upright portion of the post means, said guide means being located adjacent opposite sides of the arm to laterally stabilize the arm during movement thereof between the down and up positions.

26. The apparatus of claim 19 wherein: the expandable and contractible means comprises a linear actuator having an electric motor, and means for controlling the electric power supply to said motor.

27. The apparatus of claim 26 wherein: the means for controlling the power supply to said electric motor includes a timer operable to periodically supply electric power to said motor thereby operating the linear actuator to pivot the arm between the up and down positions.

28. The apparatus of claim 19 wherein: the mailbox support means includes a platform assembly for supporting the mailbox in a generally horizontal position, said platform assembly having leg means, said second pivot means being pivotally connected to the leg means, said third pivot means being pivotally connected to the leg means remote from the second pivot means, said leg means pivoting about the second and third pivot means to maintain the mailbox in a generally horizontal position as it moves between the down and up positions.

29. The apparatus of claim 28 wherein: said platform assembly has a generally horizontal base, said leg means being secured to said base, said mailbox being adapted to be mounted on said base.

30. The apparatus of claim 19 wherein: said roller means comprises a pair of rollers located adjacent opposite sides of the control rod means and means mounting the pair of rollers on the control rod means, each of said rollers being engageable with the track means.

31. The apparatus of claim 30 wherein: said track means is a U-shaped member having an upright channel, said rollers being located in said channel and engageable with the U-shaped member and movable along the channel in response to operation of the expandable and contractible means.

* * * * *

UNITED STATES PATENT AND TRADEMARK OFFICE
CERTIFICATE OF CORRECTION

PATENT NO. : 4,403,760

DATED : September 13, 1983

INVENTOR(S) : Palmer C. Alvermann

It is certified that error appears in the above-identified patent and that said Letters Patent is hereby corrected as shown below:

Column 2, line 47, "interrup" should be -- interrupt --.

Column 2, line 50, "eliminating" should be -- terminating --.

Column 3, line 20, after "mailbox" insert -- 11 --.

Column 3, line 26, "elevated" should be -- elevation --.

Column 5, line 25, "acutated" should be -- actuated --.

Column 5, line 58, after "position," delete ",".

Column 6, line 53 (Claim 2), "expanded" should be -- extended --.

Column 7, line 43 (Claim 13), "roller" should be -- control --.

Signed and Sealed this

Thirteenth Day of December 1983

[SEAL]

Attest:

GERALD J. MOSSINGHOFF

Attesting Officer

Commissioner of Patents and Trademarks